(12) United States Patent
Pan et al.

(10) Patent No.: US 7,010,315 B1
(45) Date of Patent: Mar. 7, 2006

(54) METHOD AND APPARATUS FOR ASSIGNING A REMOTE UNIT A CHANNEL WITHIN A COMMUNICATION SYSTEM

(75) Inventors: ShaoWei Pan, Lake Zurich, IL (US); Jinzhong Zhang, Schaumburg, IL (US); Chunyang Meng, Lake Zurich, IL (US); Hechun Cai, Vernon Hills, IL (US); Richard A. Comroe, South Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/516,134

(22) Filed: Mar. 1, 2000

(51) Int. Cl.
*H04Q 7/20* (2006.01)

(52) U.S. Cl. .................. 455/519; 455/416; 455/450

(58) Field of Classification Search .......... 455/507, 455/508, 509, 517, 518, 519, 520, 521, 562, 455/522, 69, 463, 562.1, 416, 450; 370/441, 370/337, 468
See application file for complete search history.

(56) References Cited

U.S. PATENT DOCUMENTS

| | | | | |
|---|---|---|---|---|
| 5,457,808 A | * | 10/1995 | Osawa et al. .................. 455/8 |
| 5,530,916 A | * | 6/1996 | Schultz ...................... 455/518 |
| 5,566,388 A | * | 10/1996 | Brame et al. ............... 370/340 |
| 5,768,684 A | * | 6/1998 | Grubb et al. .............. 455/13.4 |
| 5,781,860 A | * | 7/1998 | Lopponen et al. ....... 455/426.1 |
| 5,881,368 A | * | 3/1999 | Grob et al. .................... 455/69 |
| 5,896,411 A | * | 4/1999 | Ali et al. ...................... 375/130 |
| 5,898,679 A | * | 4/1999 | Brederveld et al. ......... 370/315 |
| 5,914,958 A | * | 6/1999 | Chinitz et al. .............. 370/441 |
| 5,930,723 A | * | 7/1999 | Heiskari et al. ............. 455/518 |
| 5,940,763 A | * | 8/1999 | Alperovich et al. ........ 455/450 |
| 5,966,384 A | * | 10/1999 | Felix et al. .................. 370/465 |
| 5,987,326 A | * | 11/1999 | Tiedemann et al. ......... 455/442 |
| 6,005,848 A | * | 12/1999 | Grube et al. ................. 370/266 |
| 6,088,578 A | * | 7/2000 | Manning et al. .............. 455/68 |
| 6,104,709 A | * | 8/2000 | Rinchiuso et al. .......... 370/335 |
| 6,144,651 A | * | 11/2000 | Rinchiuso et al. .......... 370/335 |
| 6,272,124 B1 | * | 8/2001 | Ahn et al. ................... 370/342 |

* cited by examiner

*Primary Examiner*—Tilahun Gesesse
(74) *Attorney, Agent, or Firm*—Kenneth A. Haas; Steven A. May

(57) ABSTRACT

During a group call, each remote unit (113–118) receives a downlink supplemental transmission (109–110) that contains high-speed data (e.g., video). A single supplemental channel is utilized for each base station (101–102). On the uplink side, the supplemental channel is shared among all remote units, however only one remote unit (113–118) is allowed to transmit at a time utilizing the uplink supplemental channel. A decision is made as to which remote unit is providing a highest-voice-energy fundamental channel uplink, and that remote unit is assigned the uplink supplemental channel. The remote unit, that is currently transmitting utilizing the uplink supplemental channel, has its transmission broadcast (via downlink supplemental channels (109–110)) to all other remote units participating in the multicast.

14 Claims, 6 Drawing Sheets

METHOD AND APPARATUS FOR ASSIGNING A REMOTE UNIT A CHANNEL WITHIN A COMMUNICATION SYSTEM

FIELD OF THE INVENTION

The present invention relates generally to communication systems and, in particular, to a method and apparatus for assigning a remote unit a channel in a communication system.

BACKGROUND OF THE INVENTION

Next generation wireless communication system architecture must be able to provide an array of services comparable to wire-line services. One such service envisioned for the next generation Code Division Multiple Access (CDMA) architecture is multicasting. By definition, multicasting is a method which provides the delivery of information to multiple destinations without transmitting the same information content to each destination separately.

Typically, multicasting generates a great deal of traffic in a network. More particularly, large amounts of traffic are generated because each individual involved in a multicast session passes uplink information through the network. The magnitude of traffic is directly related to the amount of data that is transmitted through the network. Thus it is beneficial for a communication system to transmit as little as possible in order to reduce the network congestion. Therefore, a need exists for a method and apparatus for channel assignment in a wireless communication system that minimizes network traffic.

DETAILED DESCRIPTION OF THE DRAWINGS

To address the need for transmission within a communication system that reduces network congestion a method and apparatus for channel assignment within a communication system is provided herein. During a group call, each remote unit receives a downlink supplemental transmission that contains high-speed data (e.g., video). A single supplemental channel is utilized for each base station. On the uplink side, the supplemental channel is shared among all remote units, however only one remote unit is allowed to transmit at a time utilizing the uplink supplemental channel. A decision is made as to which remote unit is providing a highest-voice-energy fundamental channel uplink, and that remote unit is assigned the uplink supplemental channel. The remote unit, that is currently transmitting utilizing the uplink supplemental channel, has its transmission broadcast (via downlink supplemental channels) to all other remote units participating in the multicast. Because only a single remote unit is allowed to transmit via an uplink supplemental channel, network congestion is greatly reduced.

The present invention encompasses a method for assigning a remote unit a channel within a wireless communication system. The method comprises the steps of receiving a plurality of uplink transmissions from a plurality of remote units and determining the remote unit from the plurality of remote units. In the preferred embodiment of the present invention the remote unit is determined based on an energy of the remote unit's uplink transmission. The remote unit is assigned a high-data-rate uplink channel based on the determination.

The present invention additionally encompasses a method for assigning a remote unit a channel within a wireless communication system. The method comprises the steps of receiving a plurality of uplink communication transmissions from a plurality of remote units and determining, from the plurality of uplink transmissions, a remote unit having a highest energy transmission. The remote unit is assigned a second uplink communication signal based on the determination.

The present invention also encompasses an apparatus comprising channel circuitry having a plurality of uplink communication signals, transmitted from a plurality of remote units, as an input and a logic unit having a channel assignment command as an input. In the preferred embodiment of the present invention the channel assignment command is a command to assign a remote unit a high-speed data channel based on the energy of the remote unit's uplink communication signal.

Figure 1:
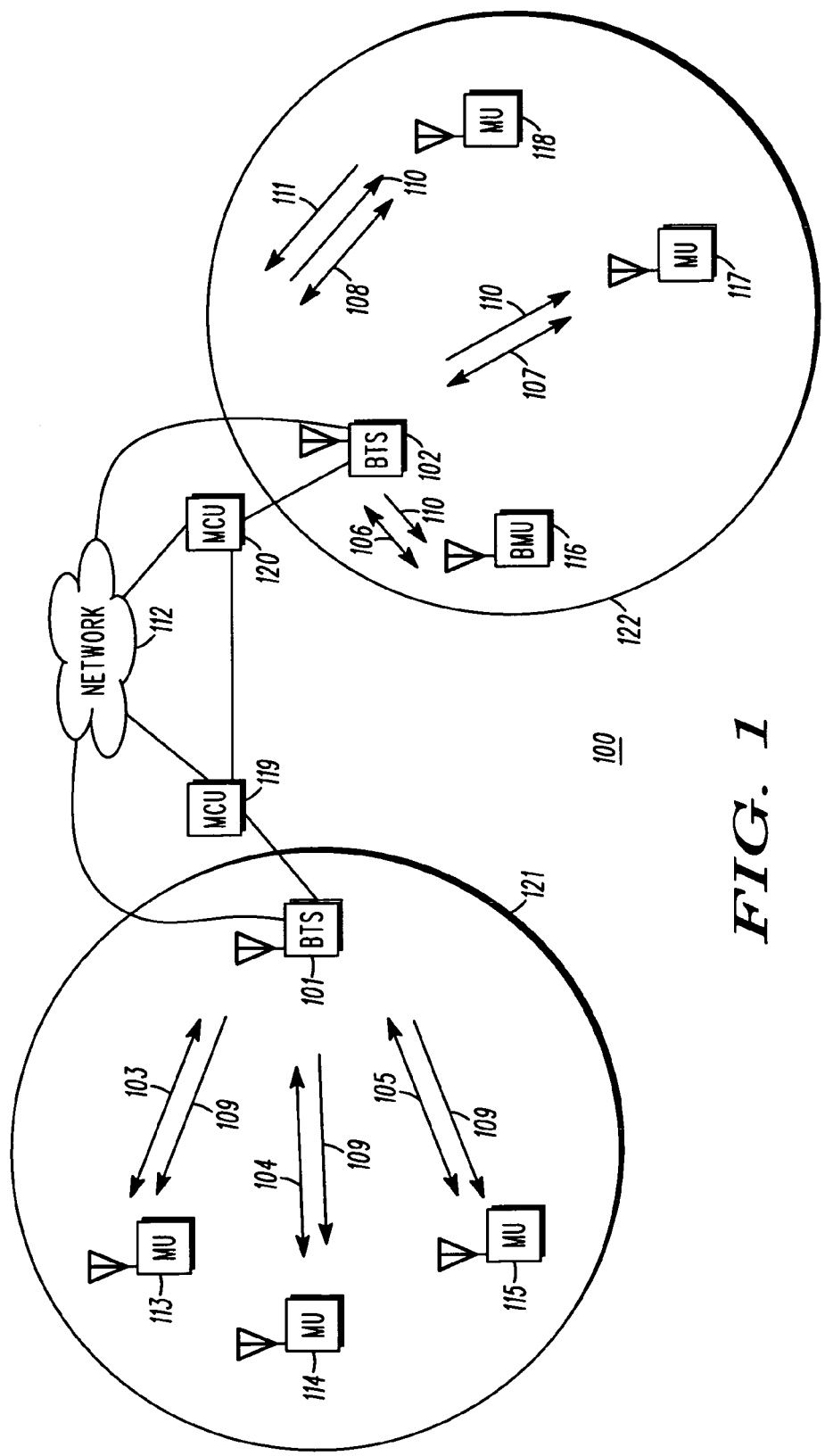
FIG. 1 is a block diagram of a communication system in accordance with the preferred embodiment of the present invention.

Turning now to the drawings, wherein like numerals designate like components, FIG. 1 is a block diagram of communication system 100 in accordance with the preferred embodiment of the present invention. In the preferred embodiment of the present invention, communication system 100 utilizes a next generation CDMA architecture as described in the cdma2000 International Telecommunication Union-Radio communication (ITU-R) Radio Transmission Technology (RTT) Candidate Submission document, but in alternate embodiments communication system 100 may utilize other analog or digital cellular communication system protocols such as, but not limited to, the next generation Global System for Mobile Communications (GSM) protocol, or the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008).

Communication system 100 includes network 112 coupled to Radio Access Networks (RANs) 121–122. Each RAN 121–122 comprises a plurality of remote, or mobile units (MUs) 113–118, at least one Base Transceiver Station (BTS) 101–102, and at least one Multiple Control Unit (MCU) 119–120. Although not shown, RANs 121–122 additionally include well known network elements such as Mobile Switching Centers (MSCs), Centralized Base Station Controllers (CBSCs) in a circuit switch network, or such as Radio Network Controller (RNCs), Gatekeepers (GKs) and GateWays (GWs) in a packet switch network. It is contemplated that network elements within communication system 100 are configured in well known manners with processors, memories, instruction sets, and the like, which function in any suitable manner to perform the function set forth herein.

In the preferred embodiment of the present invention base stations 101–102 are capable of providing a multicasting session over network 112. More particularly, base stations 101–102 utilize the Internet Group Management Protocol (IGMP) as described in Request for Comments (RFC) document 1112 and RFC 2236 of the Internet Engineering Task Force (IETF) to provide multicasting. Remote units 113–118 that wish to receive a multicast session, monitor a multicast advertisement message on a system broadcast channel to determine a session to receive. Broadcast channels are part of the common forward physical/paging channel as described in Mobile Station-Base Station Compatibility Standards for Dual-Mode Wideband Spread Spectrum Cellular Systems, Telecommunications Industry Association Interim Standard 95A, Washington, D.C. July 1993 (IS-95A), which is incorporated by reference herein.

In the preferred embodiment of the present invention, advertisement messages include information about multicast events available to remote units 113–118. The information includes the session's Internet Protocol (IP) address, port number, time and duration of the transmission, and a brief description of the event. In the preferred embodiment of the present invention, the supplemental channel request/granted/control messages for the CDMA air interface is carried as a payload in the TIA/EIA/95 Data Burst messages. An Extended Burst Type Assignment of 0x8001, as defined in TIA/EIA/TSB58-B Table4.2-1, is used to indicate that Data Burst carries a dispatch control messages.

Base stations 101–102 will join a multicast session and forward it over the air interface via a high-speed data channel (supplemental channel) if there is at least one remote unit 113–118 that requested participation in the session. Once a remote unit requests participation in the multicast event, a common supplemental channel is assigned to the remote unit, and the multicast session is broadcast to all remote units currently participating in the multicast event.

Figure 2:
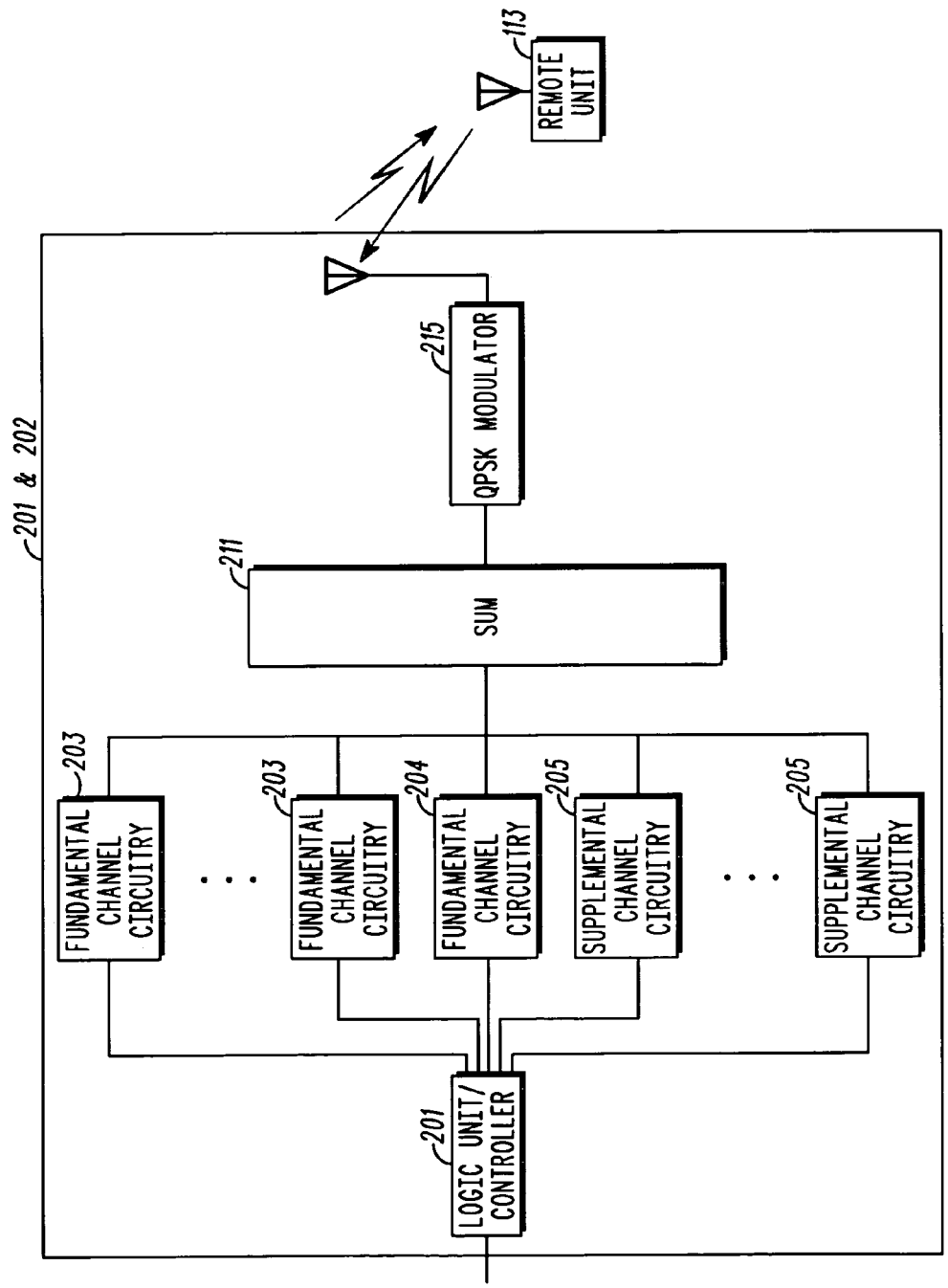
FIG. 2 is a block diagram of the base station of FIG. 1 in accordance with the preferred embodiment of the present invention.

FIG. 2 is a block diagram of base stations 101–102 of FIG. 1 in accordance with the preferred embodiment of the present invention. Base stations 101–102 comprises logic unit 201, transmit/receive circuitry comprising one or more common control channel circuits 204, one or more fundamental channel circuits 203, one or more supplemental channel circuits 205, summer 211, and modulator 215. In the preferred embodiment of the present invention, communication to remote units 113–118 may take place utilizing the supplemental channel circuitry 205 and/or fundamental channel circuitry 203. In particular, base stations 101–102 utilize two classes of channels defined for both forward and reverse transmission. In the preferred embodiment, fundamental channels 203 are similar to existing CDMA traffic channels used for voice and signaling. Similarly, common control channel 204 is used for passing system information and control signaling, along with multicast advertisement information.

When transmitting a multicast session (or group call), fundamental channels 203 or common control channels 204 (i.e., low data-rate channels) are utilized to transmit Internet Group Management Protocol (IGMP) messages for subscribing and de-subscribing to a multicast session. Fundamental channels 203 are also utilized to receive and transmit voice data to remote units 113–118 involved in the group call. CDMA traffic and common control channels are described in detail in IS-95A as well as the RTT Candidate Submission Document. Additionally, soft handoff (simultaneous communication utilizing more than one fundamental channel circuit 203) is supported utilizing fundamental channel circuitry 203.

Supplemental channel circuitry 205 is utilized for communicating high data rate services (e.g., multicast packet data, video, ..., etc.) to remote units 113–118. The data rate of the supplemental channels is specified prior to transmission. Multiple data sources are time multiplexed on this channel. In addition, the Quality-of-Service (e.g., Frame Error Rate (FER), Bit Error Rate (BER) and/or Transmission Delay) of this channel may be set and operated independently of the fundamental channel. A description of both a supplemental and fundamental channel can be found in U.S. patent Ser. No. 09/118,639 Rihchiuso, et al., assigned to the assignee of the present invention, and incorporated by reference herein.

Data transmission and channel assignment from base stations 101–102 in accordance with the preferred embodiment of the present invention occurs as follows: Reverse Access (Common Control) channel circuitry receives a subscribe message from a remote unit to join a multicast session. The subscribe message is preferably transmitted over a traffic channel that has already been established between the remote unit and the base station. As described above, the subscribe message comprises an IGMP message for subscribing to the multicast session. Logic unit 201 determines if it is currently subscribed to the requested multicast session (i.e., another remote unit is currently subscribed to the session) and if so, an acknowledgment (Ack) message is sent to the remote unit. In the preferred embodiment of the present invention the Ack message contains the current channel (i.e., the assigned Walsh code and the long code), with the long code being a function of the multicast IP address. In the preferred embodiment of the present invention, the Ack message contains the Supplemental Channel Walsh code and long code that is used by the remote unit to demodulate the multicast session. In the preferred embodiment, if base stations 101–102 are not currently subscribed to the multicast session, logic unit 201 determines the multicast address and sends a query message requesting to join the multicast session.

During the multicast session, each remote unit 113–118 receives downlink supplemental transmission 109–110 that contains high-speed data (e.g., video). In the preferred embodiment of the present invention a single supplemental channel is utilized for each base station 101–102. On the uplink side, the supplemental channel is shared among all remote units, however only one remote unit 113–118 is allowed to transmit at a time utilizing the uplink supplemental channel. The remote unit, that is currently transmitting utilizing the uplink supplemental channel, has its transmission broadcast (via downlink supplemental channels 109–110) to all other remote units participating in the multicast. For example, as shown in FIG. 1, remote units 113–118 are participating in a multicast session, with remote unit 118 supplying high speed data via uplink supplemental channel 111. The high-speed data is transmitted to all remote units 113–118 involved in the session via downlink supplemental channels 109–110.

Even though only one remote unit 113–118 can simultaneously supply high-speed data to the multicast session, all remote units 113–118 can simultaneously participate (by voice and all control messages) in the session via fundamental traffic channels 103–108. Thus, in accordance with the preferred embodiment of the present invention, all remote units 113–118 can supply voice traffic via uplink fundamental channels 103–108. The voice traffic for all remote units 113–118 is combined (discussed below) and transmitted to all remote units 113–118 via a downlink fundamental traffic channel.

In the preferred embodiment of the present invention each remote unit 113–118 may transmit utilizing the uplink supplemental channel. A decision is made as to which remote unit is providing a highest-voice-energy fundamental channel uplink, and that remote unit is assigned the uplink supplemental channel. For example, with reference to FIG. 1, uplink fundamental channel 107 has the highest-voice-energy out of all uplink fundamental channels 103–108, since supplemental channel 111 has been assigned to remote unit 118. Thus in accordance with the preferred embodiment of the present invention a plurality of uplink transmissions are received from a plurality of remote units. A determination is made as to which remote unit has the highest uplink transmit energy, and that remote unit is assigned the high-data-rate uplink channel. This process repeats periodically, with new remote units constantly being assigned the high-speed-data channel based on their transmit energy. Thus in accordance with the preferred embodiment of the present invention at a later time a second plurality of uplink transmissions are received from the plurality of remote units, and a second remote unit is determined and assigned the supplemental channel as described above.

The present invention allows for only a single remote unit 113–118 to transmit on a supplemental channel at a time. Because of this, over-the-air traffic is greatly reduced. Additionally, since high-speed transmission is limited, network traffic is similarly reduced.

Figure 3:
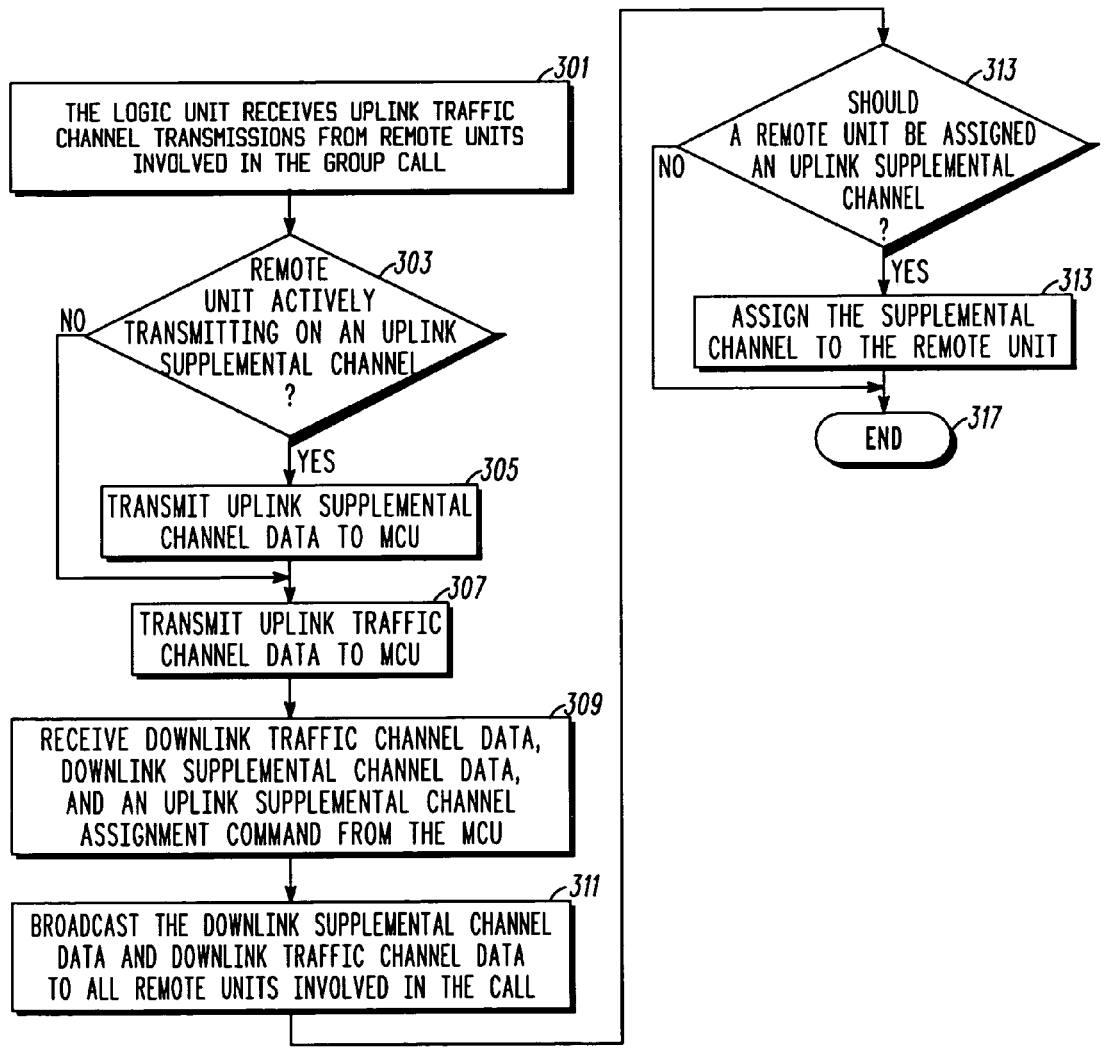
FIG. 3 is a flow chart showing operation of the base stations of FIG. 1 and FIG. 2 in accordance with the preferred embodiment of the present invention.

FIG. 3 is a flow chart showing operation of the base stations of FIG. 1 and FIG. 2 in accordance with the preferred embodiment of the present invention. The following description assumes that remote units 113–118 are actively participating in a group call, each having a unique traffic channel assigned, and a shared uplink and downlink supplemental channel assigned. The logic flow begins at step 301 where logic unit 201 receives a plurality of uplink traffic channel transmissions from remote units 113–118 involved in the group call. Next, at step 303 logic unit 201 determines if a remote unit involved in the call, within the base station's coverage area, is actively transmitting on an uplink supplemental channel. If a local remote unit is actively transmitting an uplink supplemental channel, then the logic flow continues to step 305 where the uplink supplemental channel data is transferred to network 112. If, at step 303 it is determined that no remote unit involved in the group call is currently transmitting an uplink supplemental channel, then the logic flow continues to step 307. At step 307, logic unit 201 transfers the signals received via the traffic channels to an MCU 119–120.

At step 309 logic unit 201 receives downlink traffic channel data and downlink supplemental channel data from network 112. Additionally, logic unit 201 receives an uplink supplemental channel assignment command from the MCU. In the preferred embodiment of the present invention the downlink traffic channel data is a combination of a plurality of remote unit uplink voice transmissions for those remote units involved in the call. The downlink supplemental channel data is data transmitted from a remote unit actively transmitting an uplink supplemental channel. Finally, the uplink supplemental channel assignment command comprises instructions on which remote unit should be given permission to transmit data using the uplink supplemental channel.

At step 311, the base station broadcasts the downlink supplemental channel data and downlink traffic channel data to all remote units 113–118 involved in the call. At step 313 logic unit 201 determines (via the supplemental channel assignment command) if a remote unit involved in the call, within the base station's coverage area should be assigned the uplink supplemental channel. If at step 313 it is determined that a remote unit within the base station's coverage area should be assigned the uplink supplemental channel, then the logic flow continues to step 315 where the channel is assigned, otherwise the logic ends at step 317.

As discussed above, in accordance with the preferred embodiment of the present invention only a single remote unit is allowed to transmit at a time utilizing the supplemental channel. The supplemental channel is shared among remote units so that every remote unit involved in the group call can transmit utilizing the supplemental channel. Because of this, over-the-air traffic is greatly reduced. Additionally, since high-speed transmission is limited, network traffic is similarly reduced.

Figure 4:
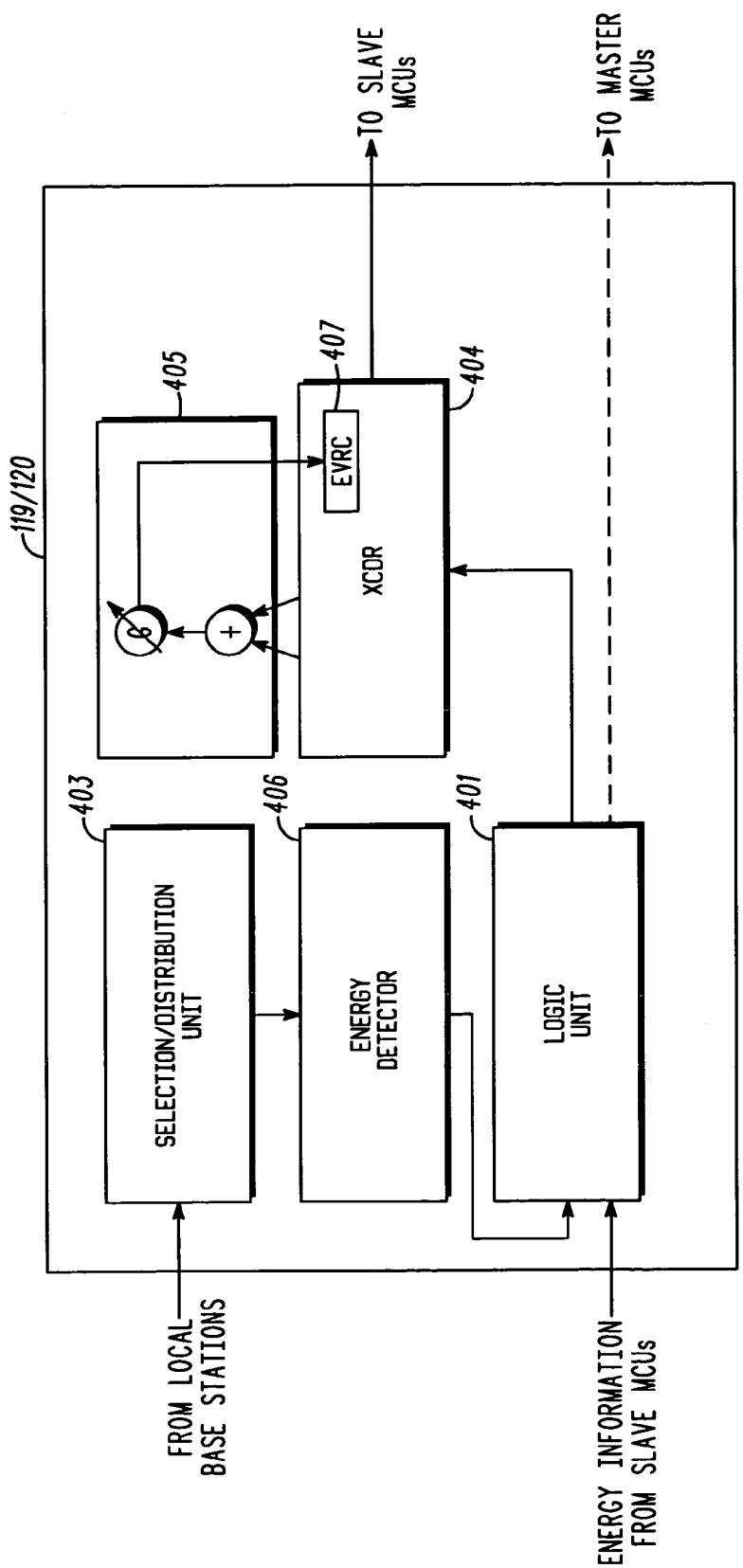
FIG. 4 is a block diagram of a Multiple Control Unit of FIG. 1 in accordance with the preferred embodiment of the present invention.

FIG. 4 is a block diagram of an MCU of FIG. 1 in accordance with the preferred embodiment of the present invention. MCU 119/120 comprises Logic Unit 401, Selection/Distribution Unit 403, Transcoder (XCDR) 404, Summer 405, and Energy Detector 406. In the preferred embodiment of the present invention the MCU is coupled to local base stations within its RAN. Additionally, for each group call, a master MCU is identified if the group call involves more than one RAN. In the preferred embodiment of the present invention the master MCU is the MCU that the caller belongs to. In a group call, the person who initiates a call with a group listed phone numbers is identified as a "caller", the person who is called by one of the listed phone numbers is identified as a "callee". Because a group call is not a point-to-point call, the call has to use MCUs as a conference bridge. The first connection of the caller is an MCU assigned by a gatekeeper or a CBSC. This identified MCU is defined as a master MCU. All other subsequent MCUs are identified as slave MCUs.

Once a master MCU is identified (in this case MCU 120) all local highest-voice-energy information in local (slave) MCU's are sent to the master MCU. This is accomplished by sending the two highest-voice-energies in each slave MCU to the master MCU 120 by default. The remote unit with the highest-voice-energy info in all MCU's is identified by the master MCU, and that remote unit is granted the uplink supplementary channel for sending video to its BTS and its MCU.

Figure 5:
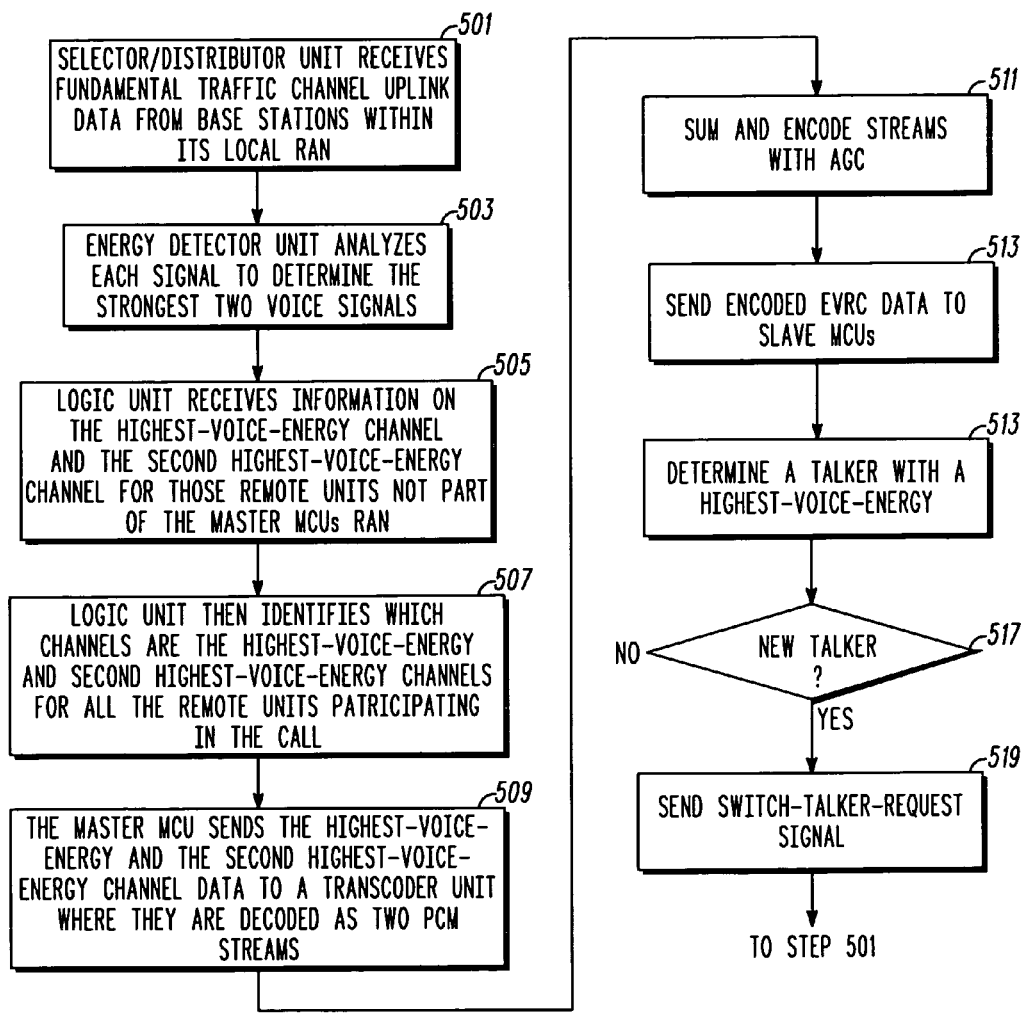
FIG. 5 is a flow chart showing operation of a Multiple Control Unit of FIG. 1 in accordance with the preferred embodiment of the present invention.

Operation of a master MCU in accordance with the preferred embodiment of the present invention occurs as illustrated in FIG. 5. At step 501 selector/distributor unit 403 receives a plurality of uplink transmissions (traffic channel) from a plurality of remote units within its local RAN. In the preferred embodiment of the present invention the plurality of uplink transmissions comprise fundamental traffic channel data comprising voice data transmitted from all remote units involved in the group call, however in alternate embodiments, fundamental traffic channel data may comprise other forms of data such as power control, supplementary channel request/grant/setup issues, soft handoff, etc.

Once fundamental traffic channel data has been received, energy detector unit 406 analyzes each signal to determine the strongest two voice signals (step 503). In the preferred embodiment of the present invention, each uplink fundamental traffic channel sends voice compressed code (EVRC, Enhanced Variable Rate Data Codec, for CDMA by IS-127) data to a local MCU. Based on the code rate (Rate 1=>full, Rate ½=>half, Rate ⅛=>⅛ rate or all 1's rate) bits and FCBG/ACBG (Fixed/Adaptive CodeBook Gain) bits in each uplink traffic channel, the voice energy is calculated in the energy detector unit 406.

At step 505, logic unit 401 receives a plurality of uplink transmissions (traffic channel) from a plurality of remote units (involved in the group call) that are not part of its local RAN. In addition to the uplink transmission, information on the highest-voice-energy channel and the second highest-voice-energy channel for those remote units is also provided. In other words, at step 505 each slave MCU provides the master MCU with the uplink transmissions from the highest two energy uplink transmissions, within the slave MCUs local RAN, for those remote units involved in the call. Logic unit 401 then identifies which channels are the highest-voice-energy and second highest voice energy channels for all remote units 113–118 participating in the call (step 507). In other words, at step 507, a subset of all remote units involved in the call is determined based on an energy of their uplink transmission. At step 509, the logic unit 401 sends the highest-voice-energy and the second highest-voice-energy channel data to transcoder unit 404 where they are decoded as two PCM streams. These streams are summed in summation unit 405 and combined as one steam with AGC (Automatic Gain Control), and then encoded with EVRC vocoder 407 in transcoder unit 404 (step 511). The encoded EVRC data is sent to every slave MCU through the selector/distributor unit 403 by network 112. Every MCU sends this duplicated encoded EVRC data to all remote units 113–118 involved in the call via downlink fundamental traffic channel 103–108, respectively (step 513).

In the preferred embodiment of the present invention only two signals are combined because the EVRC vocoder can only encode a maximum two people's voices. If more than two people's voices sum together, patch information is beyond the limitation of EVRC vocoder. Additionally, by summing the highest voice energy background noise in the conference is greatly reduced. It should be noted though, that in alternate embodiments, where other forms of vocoding are used, more than two voices can be summed together.

At step 515, the energy detector and logic control unit in master MCU determines a talker with the cumulated highest-voice-energy. At step 517, logic unit 401 determines if a new talker exists with the time cumulated highest-voice-energy in a certain time period (the time period can be 1 second), and if so, the logic control unit in the master MCU sends the switch talker request signal (uplink supplemental channel assignment command) to all BTS's by RNCs (step 519). The logic flow returns to step 501. If, at step 517 it is determined that a new talker does not exists with the time cumulated highest-voice-energy in a certain time period, the logic flow returns to step 501.

In the preferred embodiment of the present invention the listeners and current talker receive downlink supplementary channel information from their fundamental traffic channels. A future talker receives the uplink supplementary channel information from its fundamental traffic channel. After RNCs and master MCU get all acknowledgments, a supplemental channel assignment is issued before the new video I (Intra) frame is generated in the current talker.

The procedure involves only the current talker and future talker. If the current talker and new talker are in the same BTS, the RNCs, through the BTS, send the uplink supplementary info to the new talker and downlink supplementary info to current talker. When the RNCs and master MCU get acknowledges from current and new talkers, the channel assignment command is sent out. The current talker will close the uplink supplementary channel transmission and turn on the downlink supplementary receiver. After the BTS gets the acknowledge from current talker, the new talker turns off the downlink supplementary receiver and turns on the uplink supplementary transmission. If current talker and new talker are in the different BTS's, and the new talker's BTS has the uplink supplementary resource, the channel assignment command is sent out from RNC's and master MCU. The current talker turns off the uplink supplementary transmission and turns on the downlink supplementary receiver, and its BTS turns off the uplink supplementary receiver. The new talker turns off the downlink supplementary receiver and turns on the uplink supplementary transmission, and its BTS turns on the uplink supplementary receiver. All supplementary channel control messages, such as power control, request, acknowledge etc, are sent to/received from via individual fundamental channels.

Since there is no requirement for each remote unit to change the fundamental traffic channel, the fundamental traffic channel is a basic voice and control channel. All info for supplementary channel setup is sent from the fundamental traffic channel as well. No matter how a master MCU switches a talker, each remote unit 113–118 uses its fundamental traffic channel 103–108 to listen to either one talker or two talkers. Since the fundamental traffic channels 103–108 have already been assigned between every remote unit 113–118 and its BTS 101–102, all information for the supplementary channels 109–111 can be predicted in advance greatly reducing the set up time for the supplementary channel. Additionally, since the fundamental traffic channels 113–118 are designed as narrow band channels and the supplementary data channels 109–111 are designed as wide band channels, the supplementary channel broadcast can greatly save RF resources.

Figure 6:
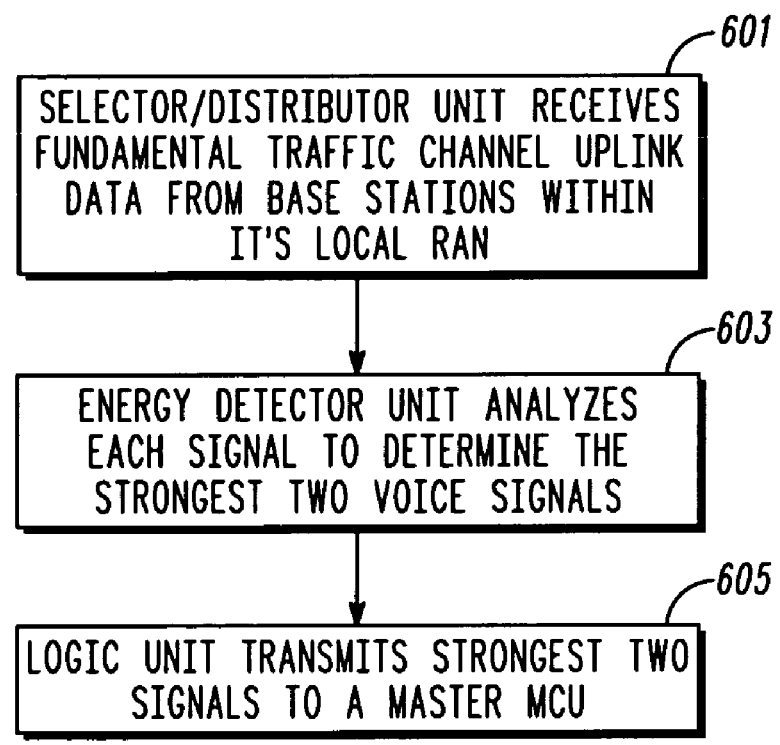
FIG. 6 is a flow chart showing operation of a Multiple Control Unit of FIG. 1 in accordance with the preferred embodiment of the present invention.

FIG. 6 is a flow chart showing operation of a Multiple Control Unit of FIG. 1 in accordance with the preferred embodiment of the present invention. At step 601 selector/distributor unit 403 receives fundamental traffic channel uplink data from base stations within its local RAN. In the preferred embodiment of the present invention fundamental traffic channel data comprises voice data transmitted from all remote units involved in the group call, however in alternate embodiments, fundamental traffic channel data may comprise other forms of data such as power control, supplementary channel request/grant/setup issues, soft handoff, etc. Once fundamental traffic channel data has been received, energy detector unit 406 analyzes each signal to determine the strongest two voice signals (step 603). At step 605, logic unit 401 transmits the two highest energy signals to a master MCU.

While the invention has been particularly shown and described with reference to a particular embodiment, it will be understood by those skilled in the art that various changes in form and details may be made therein without departing from the spirit and scope of the invention. For example, although remote units 113–118 are shown as mobile units, one of ordinary skill in the art will recognize that remote units 113–118 may be stationary. Additionally, although MCUs 119–120 were shown existing separate from base stations 101–102, in an alternate embodiment of the present invention, MCUs 119–120 may be incorporated into base station circuitry. It is intended that all such changes come within the scope of the following claims and their equivalents.

The invention claimed is:

1. A method for assigning a remote unit a channel within a wireless communication system, the method comprising the steps of:

receiving a plurality of uplink transmissions from a plurality of remote units involved in a group call;

determining the remote unit from the plurality of remote units, wherein the remote unit is determined based on an energy of the remote unit's uplink transmission; and assigning the remote unit a high-data-rate uplink channel based on the determination.

2. The method of claim 1 wherein the step of receiving the plurality of uplink transmissions from the plurality of remote units comprises the step of receiving a plurality of traffic channel transmissions from the plurality of remote units.

3. The method claim 1 wherein the step of determining the remote unit comprises the step of determining the remote unit from the plurality of remote units, wherein the remote unit has a highest energy uplink transmission.

4. The method of claim 1 wherein the step of assigning the remote unit the high-data-rate channel comprises the step of assigning the remote unit a supplemental channel.

5. The method of claim 1 further comprising the steps of:

receiving data from the remote unit via the high-data-rate channel; and broadcasting the data to the plurality of remote units via a high-data-rate downlink channel.

6. The method of claim 5 further comprising the steps of:

receiving a second plurality of uplink transmissions from a plurality of remote units;

determining a second remote unit from the plurality of remote units, wherein the remote unit is determined based on an energy of the remote unit's uplink transmission; and assigning the remote unit the high-data-rate uplink channel based on the determination.

7. A method for assigning a remote unit a channel within a wireless communication system, the method comprising the steps of:

receiving a plurality of uplink communication transmissions from a plurality of remote units;

determining, from the plurality of uplink transmissions, a remote unit having a highest energy transmission; and assigning the remote unit a second uplink communication signal based on the determination.

8. The method of claim 7 further comprising the steps of:

receiving data from the remote unit via the second uplink communication signal; and broadcasting the data to substantially all of the plurality of remote units.

9. The method of claim 7 wherein the step of receiving a plurality of uplink communication transmissions comprises the step of receiving a plurality of uplink traffic channel transmissions.

10. The method of claim 7 wherein the step of assigning the remote unit a second uplink communication signal comprises the step of assigning the remote unit a high-speed data channel.

11. An apparatus comprising:

channel circuitry having a plurality of uplink communication signals, transmitted from a plurality of remote units, as an input; and a logic unit having a channel assignment command as an input, wherein the channel assignment command is a command to assign a remote unit, from the plurality of remote units, a high-speed data channel based on the energy of the remote unit's uplink communication signal.

12. The apparatus of claim 11 wherein the channel circuitry is traffic channel circuitry.

13. The apparatus of claim 11 wherein the high-speed data channel is a supplemental channel.

14. The apparatus of claim 11 wherein the remote unit has a highest energy of the plurality of remote units.

* * * * *